(12) United States Patent
DeLeon

(10) Patent No.: US 6,301,050 B1
(45) Date of Patent: Oct. 9, 2001

(54) IMAGE ENHANCEMENT SYSTEM FOR SCALED VIEWING AT NIGHT OR UNDER OTHER VISION IMPAIRED CONDITIONS

(75) Inventor: Jose M. DeLeon, Columbus, OH (US)

(73) Assignee: Optics Wireless Led, Inc., Columbus, OH (US)

( * ) Notice: Subject to any disclaimer, the term of this patent is extended or adjusted under 35 U.S.C. 154(b) by 0 days.

(21) Appl. No.: 09/417,701

(22) Filed: Oct. 13, 1999

(51) Int. Cl.[7] .................................................. G02B 27/10
(52) U.S. Cl. ......................... 359/618; 359/630; 359/633; 345/8
(58) Field of Search .................................. 359/618, 630, 359/633, 637; 345/7, 8

(56) References Cited

U.S. PATENT DOCUMENTS

| | | | |
|---|---|---|---|
| 5,886,822 | * | 3/1999 | Spitzer ................................. 359/630 |
| 6,046,712 | * | 4/2000 | Beller et al. ............................ 345/8 |
| 6,091,546 | * | 7/2000 | Spitzer ................................. 359/618 |

* cited by examiner

*Primary Examiner*—Loha Ben
(74) *Attorney, Agent, or Firm*—Bracewell & Patterson, L.L.P.

(57) ABSTRACT

An image enhancement system for scaled viewing of surrounding objects at night or other vision impairing conditions such as dust, smoke, rain, fog, any combination of these conditions or other adverse weather conditions. The system includes a set of glasses or "headset", which a user wears in a manner similar to a pair of sun or prescription glasses. Affixed to the headset is a camera system which matches a lens element with high speed electronic circuitry to provide an enhanced image of a viewed object, in true scale and range, on LCD screens in front of the user's eyes. Audio is optionally provided. A high intensity wave form illuminator is used to further illuminate the object being viewed, and is preferably attached to the headset. The user has full control over optical properties of the viewed enhanced image, and the system can be activated by switch, by voice or by motion.

21 Claims, 5 Drawing Sheets

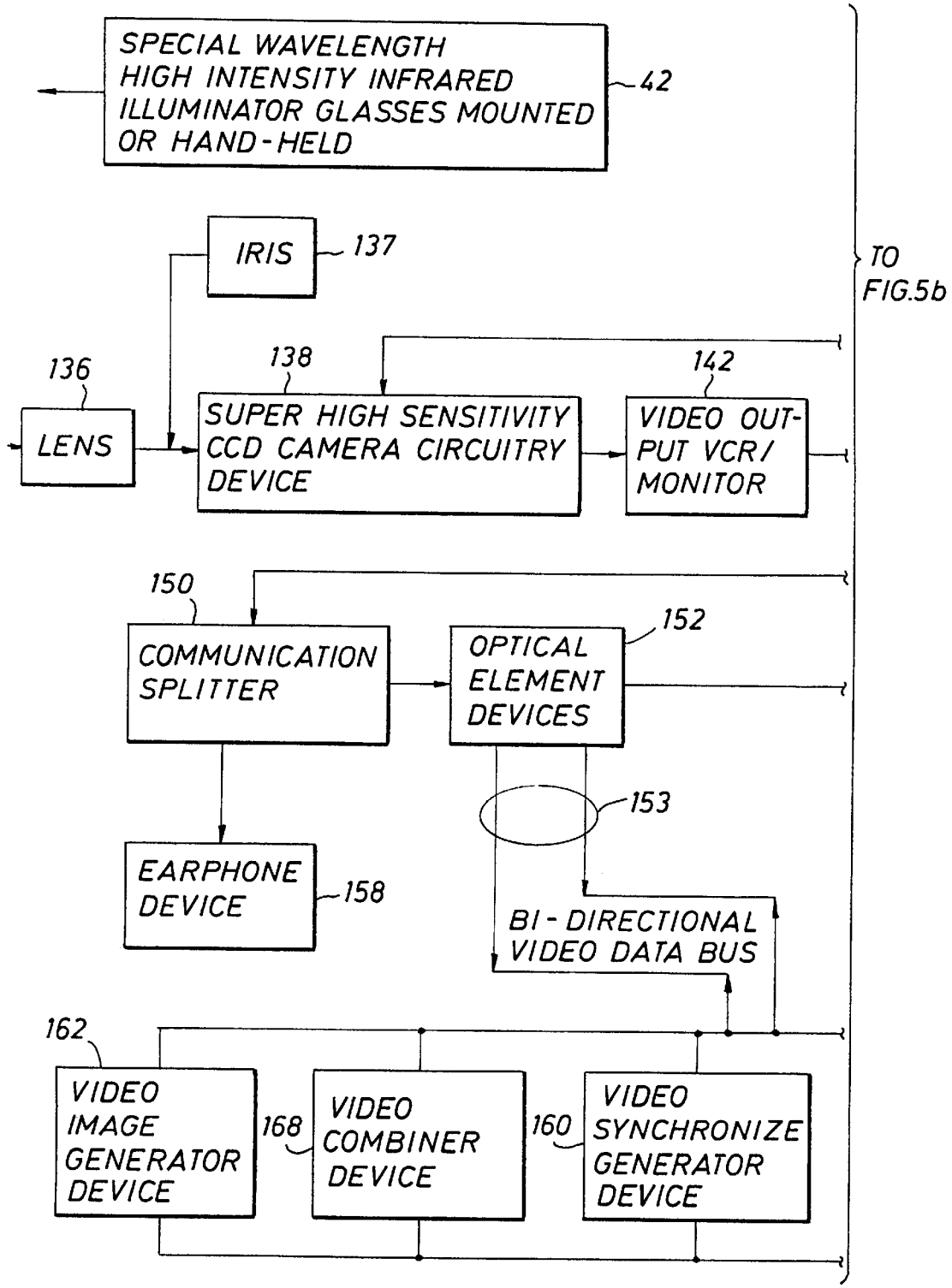

IMAGE ENHANCEMENT SYSTEM FOR SCALED VIEWING AT NIGHT OR UNDER OTHER VISION IMPAIRED CONDITIONS

BACKGROUND OF THE INVENTION

1. Field of the Invention

This invention is directed toward a vision enhancement system, and more particularly toward a vision enhancement system which allows a user to view objects with normal perspective and scale under conditions of total darkness, or other conditions limiting normal vision. or adverse weather conditions.

2. Background of the Art

Clear vision with correct depth and size or scale perspective under adverse conditions is critically important in many situations. The following two examples are presented for purposes of illustration, but by no means fully describe the broad background of the art.

Night time military operations require a complete and accurate knowledge of the surroundings. Prior art systems such as radar, infrared imaging, laser based systems and the like have provided means for locating and ranging surrounding objects such as buildings, military equipment and even personnel under conditions of darkness and smoke. They are based upon the specific characteristics of the identified objects. As an example, radar identification systems depend upon, among other parameters, the object's electromagnetic reflectivity characteristics. As an additional example, infrared systems are based upon, among other parameters, the object's temperature contrast with the surrounding environs. Such physical characteristics might not be sufficient to fully identify the object. In addition, these prior art systems are typically large, are often mounted in a command post or vehicle, and are not designed to be comfortably carried and worn by personnel.

Fire fighters typically work under conditions in which smoke, smog, adverse weather conditions or darkness impair, if not totally obscure, normal vision. This presents a visual hindrance in rescue and fire fighting operations in locations such as a smoke filled building at night. Flash lights and other means of illumination can overcome darkness, but are virtually useless in smoky or dusty conditions. Radar, image intensifying ($I^2$) systems, and infrared systems, respectfully, are conceptually not applicable because of typical close quarters encountered by the fire fighter, and the extreme and perturbed temperature contrasts caused by burning material and depth perception could be 5:1, 8:1 or greater on infrared (IR) systems or in adverse weather conditions, very difficult to maneuver around in hostile environments. Limited bad weather conditions can be handled by prior devices, but they generally fail in most adverse weather conditions. In performing their jobs, it is also critical that the fire fighter's hands be free. This requires any type of vision enhancement system to be "worn" by the fire fighters. Large prior art systems are not suited for fire fighting operations. A miners type head lamp is light in weight, would free the fire fighter's hands, and provide vision enhancement under conditions of darkness. Such a lamp would, as stated previously, be useless in smoky, dusty or foggy conditions. Systems are available which are relatively light in weight, can be worn by the user and enhance vision under limited or selected adverse conditions. These systems can be broadly classified as passive infrared (IR) systems and active $I^2$ systems. Each class of systems will be discussed in detail in the following paragraphs.

Prior art passive IR based systems and include equipment IR hand held cameras made by Safety Specialist Inc., Raytheon, and ITT. Raytheon, Hytek International, ITT, FLIR and Nikon also markets IR sensing goggles, binoculars, monoculars or hand held systems. The Russian military also produced a variety of IR based systems, and these systems are now available as military surplus. These systems have very poor night vision capabilities, repairs are difficult, and replacement parts are usually difficult to obtain.

All of the IR based systems referenced above will work, as passive units, only in complete darkness in proper or selected weather conditions. Most prior art $I^2$ systems use a red laser or a red or a near IR light beam to compensate for low light conditions or for no light conditions. The display viewed by the user of the referenced prior art systems will be either green or red with very poor resolution display, and the distance at which any of the referenced prior art systems can 100 percent recognize, verify and identify a subject (such as friendly or hostile personnel in military operations) is a very short.

Passive IR based systems do not use an external light beam for illumination of a target but, in turn, require radiated IR wave forms from an object or subject to have the capability of capturing and constructing a heat image signature from these passive light wave patterns. Using the image captured by a passive IR system (ghosting), it is very hard to verify the heat signature of a jackrabbit, a cow, a horse, a deer, or a human at distances from only 20 yards to one mile, depending upon the ambient temperature. As stated previously, such systems will simply not work in adverse weather conditions because the IR wave patterns given off by objects or subjects are absorbed by water droplets in the air. This confuses a passive IR system and "blanks" the image display. Passive IR systems will also not work in a very hot terrain environment because the temperature differential between the background and the target under surveillance are close to the same temperature signature being radiated. This small or insignificant temperature confuses the IR system, and "whites out" the image being viewed by the user.

$I^2$ systems are active systems which require external near IR light sources to illuminate the target (such as stars, the moon, red near IR or laser light beam) to be able to intensify the light source with charged phosphorous gasses to capture a green or red visible image for viewing by a user. This technique is not considered "ghosting", but it is very close to "ghosting". The depth perception on these $I^2$ systems could be 3:1, 5:1, 8:1 or greater depending on the "X" magnification factor used to see in the dark only. Stated another way, magnification is required to obtain an image, and the magnification process destroys true depth perception of the user. To use this type of system in a hostile environment will exponentially degrade the user's safety and efficiency factors. Resolution of prior art $I^2$ systems is less than 300 horizontal television (TV) lines, which can result in eye strain to the user after five to ten minutes of use or less, in addition to vertigo. Also, system failure is experienced with bright light. Furthermore, 3D and virtual reality are also experienced by the user of these systems. Extensive user training is required to compensate for depth perception and poor imaging display quality in order to permit the user to recognize, verify and identify an object or subject. When viewing an image with prior art $I^2$ systems at a distance of 20 yards or more, only the outline of the image is viewed which, again, is not "ghosting", but close to "ghosting". This prevents positive recognition, verification or identification of the viewed object or subject.

Generally speaking, prior art image enhancement systems, when used in adverse weather conditions or in complete darkness, are virtually useless without direct and intense illumination from an external light source. Furthermore, for either passive IR or $I^2$ systems to be used in the dark, weather conditions must be in the proper format for these systems to be effective in the dark. All of these systems provide enhanced images to the user which are lacking the proper sizing and perspective of the viewed object. As an example, a person viewed with a Raytheon or FLIR or ITT or SSI-Vision I system under ideal moon light, star bright, star light night illumination conditions, may appear to be only twenty feet away but, in fact, is 100 feet away from the viewer. Stated another way, enhance images viewed by the user of Raytheon or FLIR or ITT or SSI-Vision I systems lack the proper size and perspective, and therefore prevent the user from correctly and accurately identifying and ranging the viewed object. In view of the above background, an object of the present invention is to provide an enhanced imaging system which provides both black and white or color images and which is effective under any adverse weather conditions affecting normal vision such as darkness, dust, fire, smoke, fog and the like.

Another object of the present invention is to provide an enhanced imaging system which is light weight and can be worn comfortably by a user.

Yet another object of the present invention is to provide an enhanced imaging system which is fully adjustable by the user for optimum viewing. Adjustments include brightness, contrast, tint, color and sharpness of the viewed image.

Another object of the present invention is to provide an enhanced imaging system which produces images to the user which are true in perspective and scale.

Another object of the present invention is to provide a system that operated properly when encountering bright lights.

Still other objects of the present invention is to provide an enhanced imaging system which is rugged, has self contained power for operation, and provides optional audio capabilities which enables the user to hear audio signals either from a remote transmitter or amplified sounds from the surrounding environs.

There are other objects and applications of the present invention which will become apparent in the following disclosure.

SUMMARY OF THE INVENTION

The present invention is an image enhancement system for scaled viewing of surrounding objects at night or other vision impairing conditions such as dust, smoke, rain, fog, and any combination of these conditions or adverse weather conditions.

The set of glasses, which the user wears in a manner similar to a pair of sun or prescription glasses are worn with a retainer strap, consists of a housing, which is preferably plastic, to which are connected a pair of stems which extend to the rear of the user's ears and terminate at head strap holders. The set of glasses will sometimes be referred to as the "headset". A connecting flexible head strap is attached to the head strap holders and can be comfortably tightened to hold the headset firmly on the user's head. The plastic housing is positioned on the front side of the user's head. A forehead support is attached to the plastic housing to cushion the user's forehead. A very unique, high intensity and wave form illuminator is used for an illumination source, held by an inner illuminator bracket which is affixed to an illuminator bracket attached to the one side of the plastic housing. The illuminator is "aimed" in a forward direction with respect to the users face in the same horizontal plan and axis of the user's eye location thereby illuminating objects with electromagnetic radiation of various unique wavelengths in the general direction in which the user is facing. A camera mount is affixed to the opposite side of the plastic housing and contains a camera fastener and a black and white or color camera. The camera, like the illuminator, is "aimed" in a forward direction with respect to the users face in the same horizontal plane and axis of the user's eye location thereby detecting images in the general direction in which the user is facing, and which are illuminated by radiation from the illuminator.

Two high resolution displays extend downward from the plastic housing so that one screen is directly in front of each eye of the user. The screens, which are preferably Liquid Crystal Display (LCD), are man-made Lithium Niobate Crystals grown only in Siberia and China. These unique LCDs have two optical paths for doubling of the resolution displayed (true 400/800 horizontal TV lines and capability of over 1 million pixels), as twice the information is written to those LCDs at any given time. Throughout this disclosure, the terms "left" and "right" are defined with respect to the viewer's "left" and the viewer's "right", respectively. The camera is connected electrically to the LCD screens through the camera bracket and plastic housing, and presents images as recorded by the camera to each eye of the user. It should be noted that the illuminator can be optionally removed from the headset by disconnecting at the inner illuminator bracket, and held by hand or placed on a nearby object. In order to provide mobility and free both hands of the user, the illuminator is preferably mounted within the illuminator bracket of the headset.

Power for the system is provided preferably by a battery pack. The battery pack is preferably mounted in the head strap thereby positioning it behind the user's field of vision. The battery pack is connected to electronic systems within the plastic housing by means of a power cord lanyard and a connector which inserts into a receptacle within the plastic housing.

The system can optionally be supplied with an audio system. Head phones are removably mounted in electrically connecting receptacles within each headset stem thereby providing an ear phone for each ear of the user. The system can be configured to receive audio transmissions from a remote location such as a command post, or the glasses can be equipped with a directional microphone to receive audio signals preferably from the direction which the user is facing and viewing.

The user of the system can easily adjust the images received at the left and right LCD screens. Controls are provided on one side of the plastic mount and are in easy reach of the user. Upon command through the controls, a control menu appears on one or both of the LCD screens in the form of icons representing brightness, contrast, tint, color and sharpness of the image. By successively activating a control button, each adjustment icon can be selected and the corresponding parameter can be adjusted with a multi-position control switch. A reset icon is also provided giving the user the option of resetting the system to parameters set at the factory when the unit was fabricated. Control means are also provided which allow the user to illuminate either the left screen, the right screen, or both LCD screens.

The system provides high resolution night vision LCDs display units in black and white or on color. The man made Lithium Niobate Crystals are converted over to high resolution LCDs in the range of true 400, 800 or higher horizontal TV lines which relates to a capability of over 1 million pixels in black and white or color. this is not available in prior art systems. The setup of the LCD's display used by the system eliminates eye fatigue, 3-D, vertigo, and virtual reality on prolonged use requirements and extensive training programs. A refresh cycle along with twice the information written to the system's LCDs at any given time is better and quicker than any prior art display.

Unique frequencies used in the system are above the near IR (red) spectrum and well into the true IR spectrum. The higher IR spectrum can easily be seen with the system's night vision capabilities, but it is predicated by the unique lens system employed by the system. The unique high resolution LCD outputs which are capable of very high quality imaging display, correctly matched with a unique super high sensitivity camera and fast lens combination, produce a displayed image viewed in a 1:1 ratio on distance and depth perception with 100 percent recognition, identification and verification of the object or subject being viewed, and there is no system reset or fade-outs when encountering bright lights. This is not available in prior art systems. The 1:1 depth and perception image of the user's surroundings is crucial when navigating through a hostile environment, when searching and rescuing, for intercepting subjects, and for escaping, driving or flying at night.

The system can operate in either a passive or active mode, or switch between modes without any system modification of interference with night vision capabilities. This feature is not available in prior art systems.

A high resolution split screen position display is used for night vision thereby producing a real time 1:1 distance and depth perception ratio which eliminates 3-D, vertigo and virtual reality conditions.

A subject under surveillance by the system can not detect surveillance in complete darkness, smoke, fire, fog, rain or in other adverse weather conditions.

The system can "see" through heavy smoke, rain, fog, fire, and dust for a distance of 100 feet or more.

The system's unique hardware configuration will automatically adjust to the surroundings and available light with no system reset or fade-outs in going from dark to light or light to dark environments.

The system can "see" through fire to detect a human.

The image under surveillance, depending upon system modular capability utilization setup, can be transmitted wireless immediately to eight, or up to 128 designated remote locations for viewing and simultaneous recording.

The system is capable of receiving and transmitting written communication and automatic pattern recognition (neural pattern imaging transfer), better known as maps.

The system is capable of receiving and transmitting wireless information up to fifteen miles depending upon system modular capability utilization setup.

If satellite linkup communication is used, the image captured by the system can be transmitted wireless globally immediately for viewing and recording simultaneously.

The system is both voice/sound and motion activated depending on system modular capability utilization setup.

Voice recognition modules can be used to activate the system.

GPS (global positioning system which coordinates with terrain surrounding view) utilization modules can be implemented on a completely wireless communication and transmission system.

Depending upon the systems hardware configuration and output power application, the system can be mounted on a helicopter for three purposes which are (i) night flying, (ii) ease of night landing, and (iii) night sighting up to a distance of 20 miles.

Depending upon the systems hardware configuration and output power application, the system can be mounted on a tank for two purposes which are (i) night driving, and (ii) night sighting up to a distance of 20 miles.

Depending upon the systems hardware configuration and output power application, the system can be mounted on a rifle scope for two purposes which are (i) night surveillance, and (ii) night target acquisition up to 2 miles.

The system unit weighs less than one pound.

There are other applications and embodiments of the system that will become apparent in the following disclosure.

BRIEF DESCRIPTION OF THE DRAWINGS

So that the manner in which the above recited features, advantages and objects of the present invention are attained can be understood in detail, more particular description of the invention, briefly summarized above, may be had by reference to the embodiments thereof which are illustrated in the appended drawings.

It is to be noted, however, that the appended drawings illustrate only typical embodiments of the invention and are therefore not to be considered limiting of its scope, for the invention may admit to other equally effective embodiments.

DESCRIPTION OF THE PREFERRED EMBODIMENTS

The following section discloses the hardware, operation and basic principles of the image enhancement system which is used for scaled viewing of surrounding objects at night or in other vision impairing conditions such as dust, smoke, rain, fog, and any combination of these conditions.

3. Hardware

Figure 1:
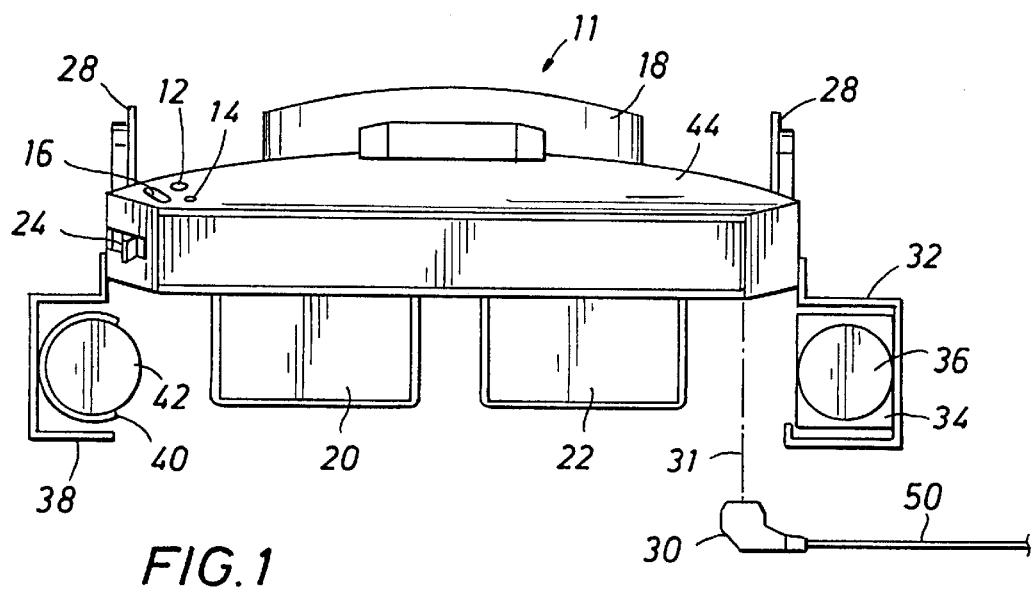
FIG. 1 is a front view of the headset of the vision enhancement system.
Figure 2B:
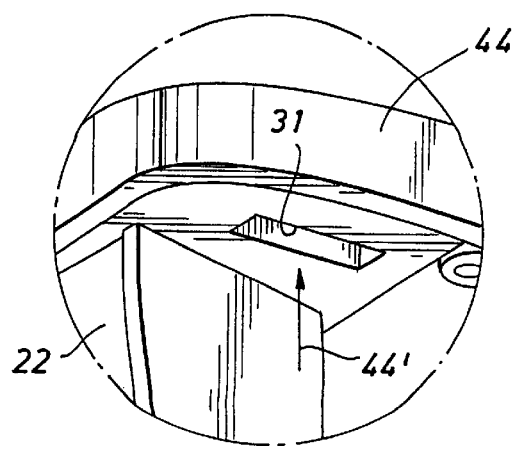
FIG. 2b is an enlarged view of the mechanism within the headset used to receive a plug of a power lanyard.

Attention is directed to FIG. 1 which is a front view of the headset portion 11 of the image enhancement system. The user wears the headset in a manner similar to a set of sun or prescription glasses, or sun visor. The glasses 11, consists of a housing 44, which is preferably high impact and light weight plastic. A pair of stems 24 extend from the sides of the housing 44 to a position at the rear of the user's ears, and terminate at head strap holders 28. These elements are better seen in FIGS. 2a and 2b. A connecting flexible head strap, which is also better seen in FIGS. 2a and 2b at 54, is attached to the head strap holders 28 and can be comfortably tightened to hold the headset 11 firmly on the user's head. The plastic housing 44 is positioned on the front side of the user's head with the user's face looking "out" of the page as illustrated in FIG. 1. A forehead support 18 is attached to the housing 44 to cushion the user's forehead.

Still referring to FIG. 1, an illumination source 42 is held by an inner illuminator bracket 40 which is affixed to an illuminator bracket 38 attached to the one side of the plastic housing 44. The illuminator is "aimed" in a forward direction with respect to the users face in the same horizontal plane and axis of the user's eye location. A camera mount 32 is affixed to the opposite side of the housing 44 and contains a camera fastener 34 and a black and white or color super high sensitive electronic compact television camera with fast lens combination, with VCR or monitor output. The camera 36, like the illuminator 42, is "aimed" in a forward direction with respect to the users face in the same horizontal plane and axis of the user's eye location.

Again referring to FIG. 1, two high resolution displays 20 and 22 extend downward from the plastic housing 44 so that the one screen is directly in front of each eye of the user. The screens, which are preferably Liquid Crystal Display (LCD), that are man-made Lithium Niobate Crystals grown only in Siberia or China. These unique LCDs have two optical paths for doubling of the resolution displayed (true 400/800 horizontal TV lines and capability of over 1 million pixels), as twice the information is written to these LCDs at any given time. Using this convention, the screen 22 is in front of the user's left eye and the screen 20 is in front of the user's right eye. The camera 36 is connected electrically to the LCD screens 20 and 22 through the camera bracket 32 and plastic housing 44, and presents continuous images as recorded by the camera to each eye of the user. It should be noted that the illuminator 42 can be optionally removed from the housing 44 by disconnecting at the inner illuminator bracket clip 40, and held by hand or placed on a nearby object. In order to provide mobility and free both hands of the user, the illuminator 42 is preferably mounted within the illuminator bracket 40 of the housing 44. It is also noted that the positions of the camera 36 and the illuminator 42 could be interchanged with no degradation in operation of the system.

Figure 2A:
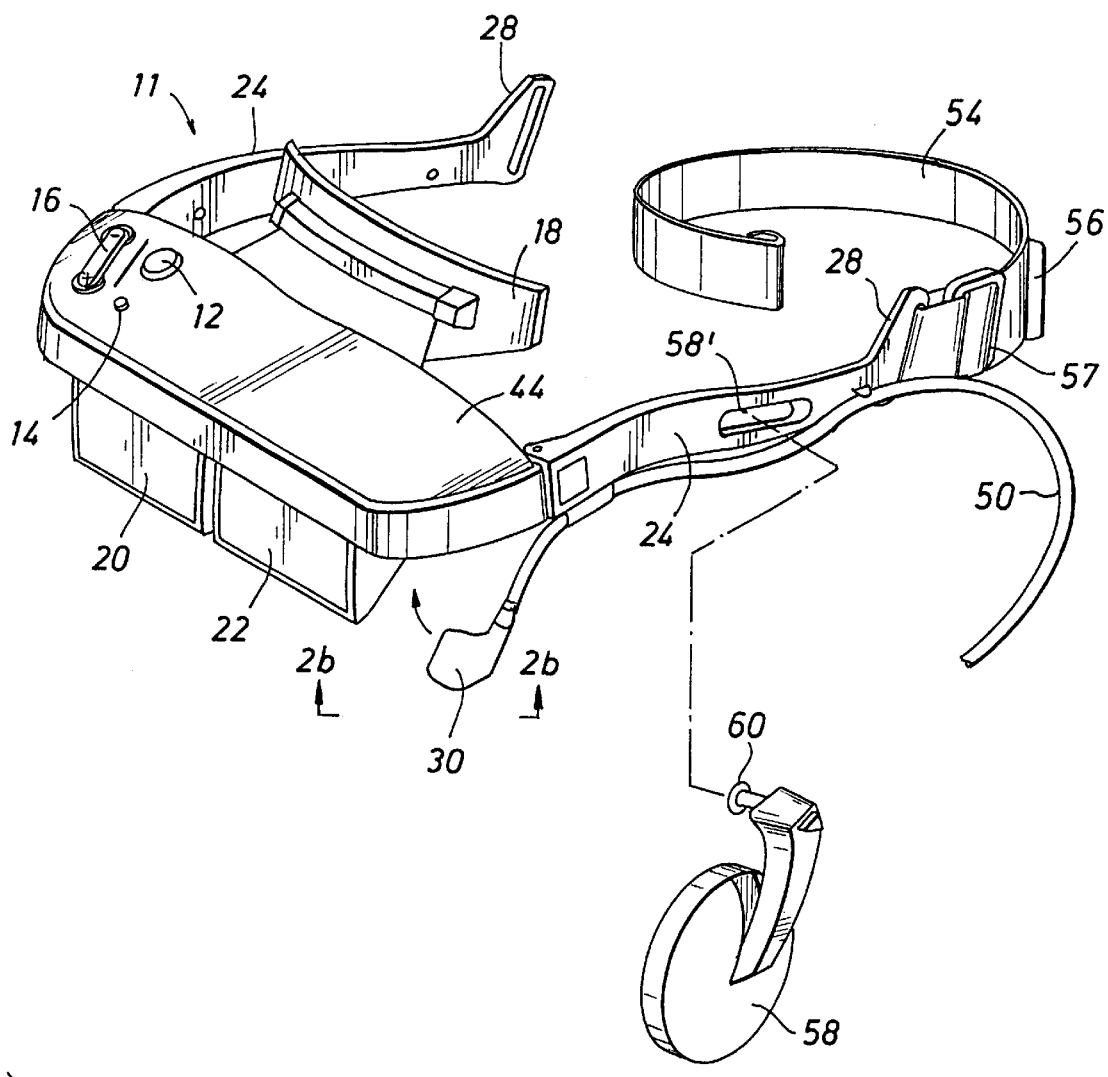
FIG. 2a is a left-hand perspective side view of the headset of the vision enhancement system.

Attention is next directed to FIG. 2a which is a left-hand perspective side view of the headset 11 of the vision enhancement system. Power for the system 11 is provided preferably by a battery pack (not shown). The battery pack is preferably mounted in the head strap 54 though an electrical connector 56 thereby positioning the battery pack behind the user's field of vision. The battery pack is connected to electronic systems within the plastic housing 44 by means of a power cord lanyard 50 and a male connector 30 which inserts into a female receptacle 31 within the plastic housing 44, as better shown in FIG. 3b.

Figure 3A:
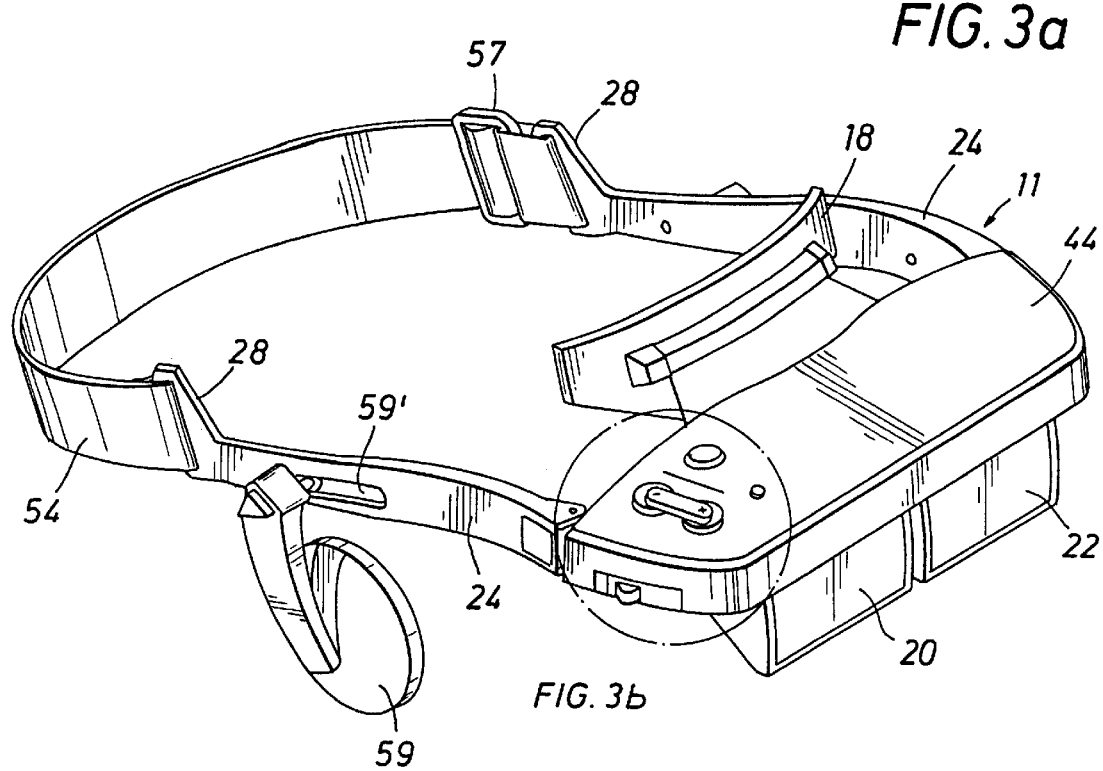
FIG. 3a is a right-hand perspective side view of the headset of the vision enhancement system.

The system 11 can optionally be supplied with an audio system. Referring again to FIG. 2a and also to FIG. 3a which is a right-hand perspective view of the head set, left headphone 58 and right headphone 59 are removably mounted with electrical connectors 60 (see FIG. 2a) in receptacles 58' and 59' within the left and right headset stems, respectively, thereby providing an ear phone for each ear of the user. The system 11 can be configured to receive audio transmissions from a remote location such as a command post, or the headset 11 can be equipped with a directional microphone (not shown) to receive audio signals preferably from the direction which the user is facing and viewing.

4. Operation

Figure 3B:
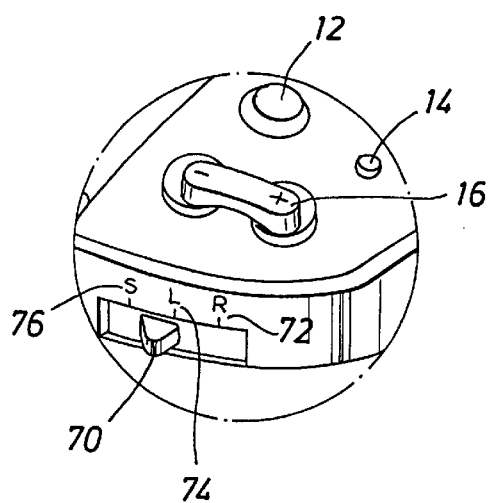
FIG. 3b is an expanded view of controls on the headset.

The user of the system can easily adjust the images received at the left and right LCD screens. Referring to FIG. 3b, controls are provided on preferably the right side of the housing 44 and are in easy reach of statistically predominantly right handed users. The controls include a power/menu button 12 which is used to activate and deactivate the system by depressing for about one second This activates or deactivates the camera 36 and illuminator 42. A power indicator 14 is illuminated only when the system 11 is "on". The controls also include a gain/audio control 16 whose functions will be subsequently discussed.

Figure 4:
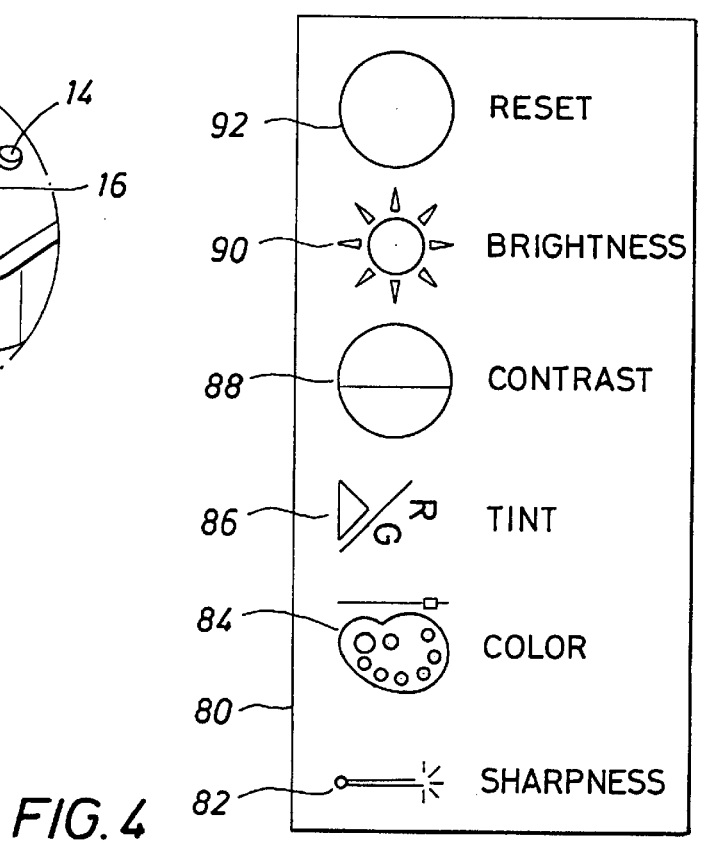
FIG. 4 is a view of a control menu presented to the user of the system with which to control the system for maximum image enhancement.

Upon command through the controls, a control menu 80, as illustrated in FIG. 4, appears on one or both of the LCD screens 20 and 22 in the form of an icon 90 representing brightness, an icon 88 representing contrast, an icon 86 representing tint, an icon 84 representing color, and an icon 82 representing sharpness of the image. To access the menu 80, the power/menu button is depressed for four seconds or more. The menu 80 the appears to the user's at preferably the bottom of the screens 20 and 22. To select an icon from the menu 80, the power/menu button 12 is depressed momentarily. The currently selected icon is highlighted. Other icons are selected by sequentially depressing the power/menu button. Once an icon is selected, the parameter represented by the icon is controlled or adjusted by depressing "+" or "−" sides of a gain/audio control button 16. As an example, if the brightness icon 90 is selected, the brightness of the image viewed by the viewer in increased by depressing the "+" side of the gain/audio control 16, and decreases by depressing the "−" side of the gain/audio control 16. If the power/menu button is the momentarily depressed, the contrast icon 88 will next be selected, and the contrast of the image seen by the viewer can be increased or decreased by depressing the "+" or "−" sides of the gain/audio control 16, respectively. A reset icon 92 is also displayed to the user. If this icon is selected and the gain/audio control 16 is momentarily depressed, all adjustable parameter settings are returned the original or "base" settings set at the factory when the unit was fabricated.

A screen illumination switch 70 is also provided as shown in FIG. 3b. If the switch 70 is set in a position 72, only the right-hand screen 20 is illuminated. If the switch is set in a position 74, only the left-hand screen 22 is illuminated, and if the switch is set at a position 76, both screens 20 and 22 are illuminated.

5. Principles of Operation

Figure 5B:
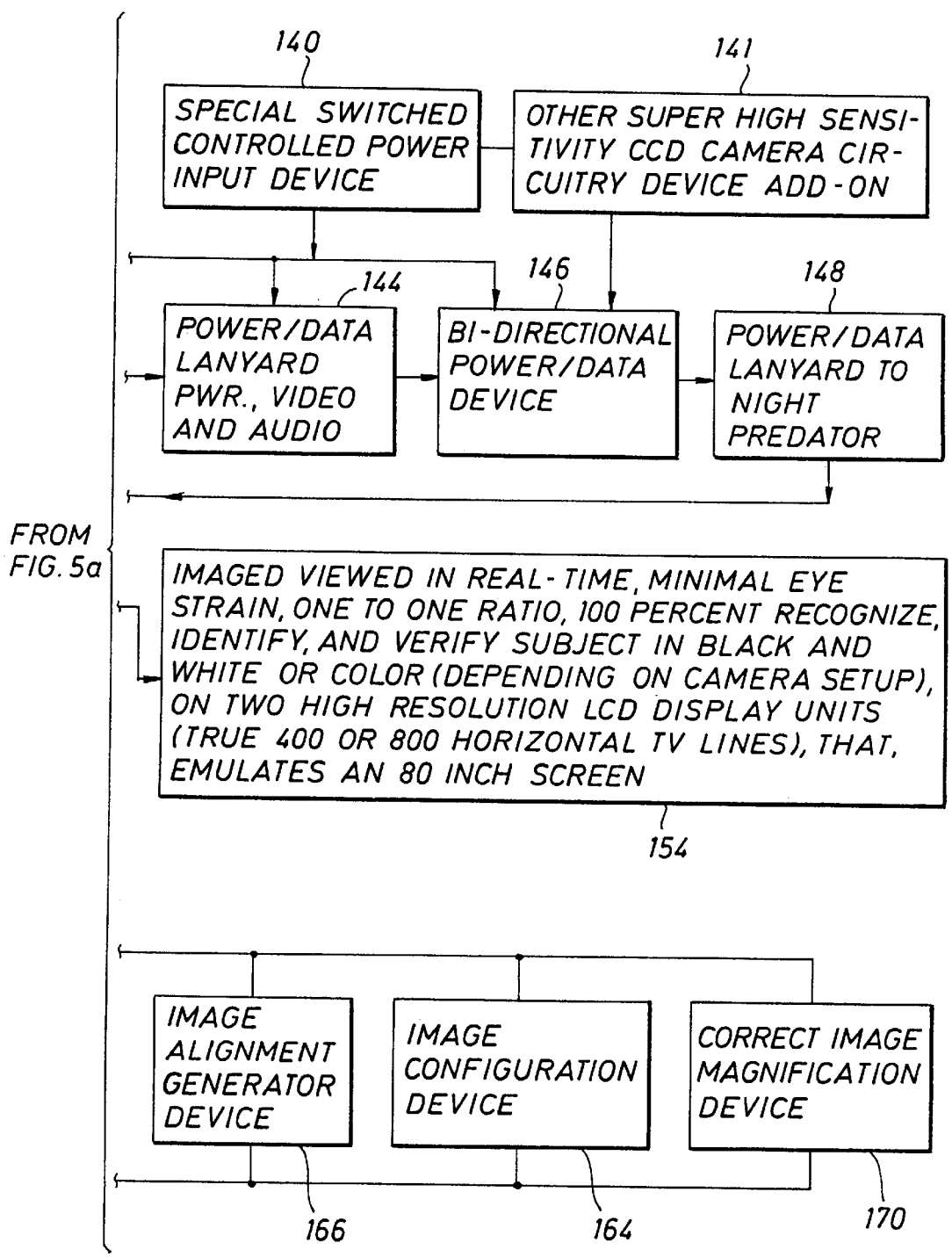
FIG. 5 is a functional flow chart of the operation of the system illustrating how the stated objects of the invention are obtained.

Attention is directed to FIG. 5 which is a functional diagram of the enhanced visual imaging system. A high intensity illuminator (also see FIG. 1) 42 consists of a wave form generator that will transmit certain unique (commonly high power signals) wave patterns which are invisible to the naked eye. The wave patterns are transmitted, in a collimated light beam source, above near IR (red) and crossover into true IR (heat imaging) wavelength spectrum. The target under surveillance is flooded with the invisible collimated light beam which forms a 10 to 30 foot diameter circle depending upon the surveillance distance. A portion of this light is reflected back by the target and transmitted back to a fast matching lens 136 attached to high sensitivity circuitry 138 of a compact television type camera 36 (see FIG. 1). These raw wavelength patterns are reflected back to the camera 36 in proper prospective format in distance and depth having a ratio of 1:1. Once captured by the lens 136, they are input into high sensitivity circuitry 138 of the television type camera 36 for an efficient and high speed processing conversion stage that takes place to accommodate a true TV, VCR or monitor output. Also included in CCD camera system is an automatic, very sensitive and very fast iris system 137 that will automatically measure light intensity for proper image configuration and disallow system reset or flare-outs. The iris system 137 is faster in adjusting to light than the human eye. The matching factor lens 136 of the camera 36 determines how much of the reflected raw wavelength information enters the camera for image processing by the circuitry 138. If the lens is matched correctly for optimum input of the raw wavelength information to enter the camera for image processing, no magnification is required to generate the image under adverse viewing conditions. This preserves the 1:1 perception and depth ratio of the generated image.

Still referring to FIG. 5, the circuitry 138 comprises several elements which are not illustrated but which will be briefly discussed to fully disclose the operation of the system. The circuitry 138 contains a power supply circuit which is triggered by a synchronized signal generator when a signal is received through the lens 136. This automatically powers up the entire system. A synchronized signal generator maintains a constant signal output that other components of the circuitry 138 mandate while processing raw reflected wavelength pattern information that enters through the lens 136. A time signal generator keeps the vertical and horizontal components of the image device in proper synchronization. A CCD pickup device is activated by the vertical and horizontal image device. The automatic, very sensitive and fast electric iris device 137 is activated by the CCD pickup device and the input of the camera lens as it "looks" into darkness to detect a target image. The circuitry 138 also contains an active low-pass filter device whose sole purpose is to eliminate noise by separating noise levels from the generated image pattern. An output amplifier is used for upgrading the electronic image transformation to the proper voltage level, transferred by hardwire to another location for viewing or recording, or for wireless transmission to a remote location for viewing or recording. When this hardware system comprising the elements defined above are matched properly to see in darkness or adverse weather conditions, the output from the camera circuitry 138 to be viewed on any type of display (or transmission to a remote location for viewing or recording) will be at a 1:1 ratio in distance and perception with 100 percent recognition, verification and identification of the viewed object.

Again referring to FIG. 5, a switched controlled power input device 140 directs proper voltage levels to proper devices within the system. The system also provides for additional camera circuit addon devices 141. A video output device 142 maintains proper video signal level output for proper transmission of images on hard wire or for wireless transmission. A power/data lanyard 144 provides electronic communication between the camera circuitry 138 and a bidirectional power/data device 146 which allows multiple high sensitivity compact television cameras to be integrated in the same lanyard "bus" 144. A second power/data lanyard 148 is used to activate the system. A communication splitter 150 splits incoming signals into audio and video components, and directs the audio component to one or more earphones 58 (also see FIGS. 2b and 3a) and directs the video component to an optical element device 152. The optical element device 152 verifies and/or corrects any indifference from the image being transferred from the video output device 142. This task is maintained internally in a bi-directional video data bus 153.

Once again referring to FIG. 5, seven elements are connected to the bi-directional video data bus 153. A video synchronizer generator device 160 starts up immediately upon receiving a video signal from the communication splitter 150 and outputs a constant signal to synchronize all other devices. A video image generator device 162 starts up immediately when commanded by the video synchronizer generator 160 to verify if received signal is noise or an actual image. If verified as noise by the video image device 162, the signal will be truncated and the system will be on standby notice until the next signal is received for verification. If the signal is verified to be an image to be processed, it will "wake up" the next appropriate processing element which is an image configuration device 164. The image configuration device gathers all valid image signal from the video image generator device 162 until the entire image has been processed. An image alignment generator device 166 starts up immediately lining up the images to be processed and delivered to a display 154. A video combiner device 168 gathers all information from the image generator device 162 and properly starts formatting the image for display at the display 154. A correct image magnification device 170 magnifies the completed image to properly fill the screen of the display device 154. It is noted that this magnification in no way perturbs the 1:1 depth and perception of the image, and is merely a formatting operation to fit image to the display device.

6. Alternate Embodiments

Figure 6:
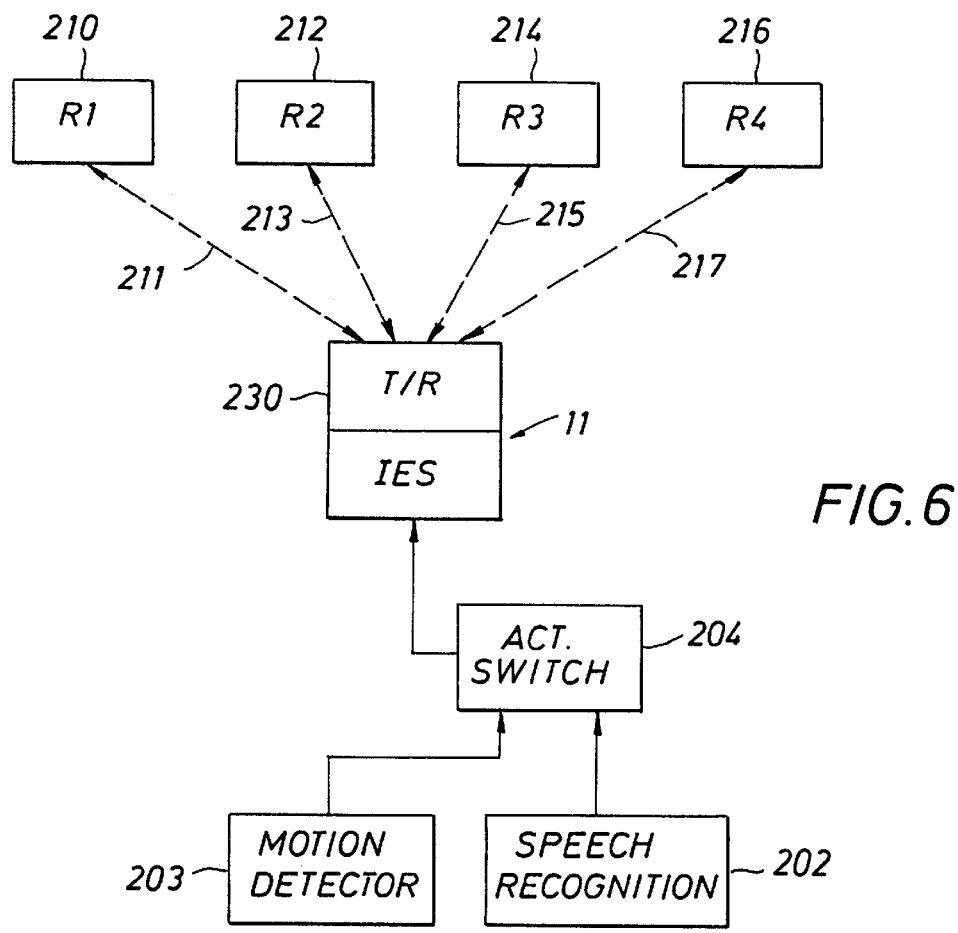
FIG. 6 illustrates alternate embodiments of the system.

FIG. 6 conceptually illustrates some of the previously discussed embodiments of the image enhancement system 11. The system can be activated by voice, speech recognition, motion or sound. As an example, a motion detection means 203 cooperating with an activation switch 204 will activate the system when moved. Likewise, a speech recognition system 202 cooperating with the activation switch 204 will activate the system 11 with a predetermined spoken word or words.

As shown conceptually in FIG. 6, visual and audio images detected by the system 11 can be transmitted and received wireless using a transceiver 230 (or by hard wire) to multiple remote locations R1, R2, R3, R4 identified by the numerals 210, 212, 214 and 216, respectively. Communication paths 211, 213, 215, 217 can be wireless or hard wire, and can be two way. Transmitted data can also comprise written information and pictorial information such as maps.

While the foregoing is directed to the preferred embodiment, the scope is determined by the claims which follow:

What is claimed is:

1. An image enhancement system for viewing an object under adverse conditions, the system comprising:
   (a) a viewing device for viewing by a user; and
   (b) a camera system to provide an enhanced image of said object to said user on said viewing device, wherein said camera system comprises
      (i) a matching factor lens, and
      (ii) high speed CCD camera circuitry, and wherein
      (iii) said lens and said camera circuitry are matched in that the lens determines how much reflected raw wavelength information enters the camera circuitry so that said object is viewed as an enhanced image by said user on said viewing device at true scale and range.

2. The system of claim 1 further comprising an illuminator to illuminate said object with high intensity infrared light.

3. The system of claim 2 further comprising an iris system which automatically adjusts said camera system for conditions of varying light intensity.

4. The system of claim 3 wherein said viewing device comprises at least one liquid crystal display.

5. The system of claim 4 further comprising a headset worn by said user, wherein said viewing device and said camera system and said illuminator are affixed to said headset.

6. The image enhancement system of claim 1, wherein the viewing device is adapted to optionally provide a black and white or color image to a user.

7. An image enhancement system for viewing an object under adverse conditions, the system comprising:

(a) a headset worn by a user;

(b) first and second viewing screens affixed to said headset wherein said first screen is positioned in front of one eye of said user and said second screen is positioned in front of another eye of said user; and (c) a camera system affixed to said headset to provide an enhanced image of said object on said first and second viewing screens, wherein said camera system comprises (i) a matching factor lens, and (ii) high speed CCD camera circuitry, wherein (iii) said lens and said camera circuitry are matched in that the lens determines how much reflected raw wavelength information enters the camera circuitry so that said object is viewed as said enhanced image by said user on said viewing screens at true scale and range.

8. The system of claim 7 further comprising an illuminator affixed to said headset to illuminate said object with high intensity infrared light, wherein said camera system and said illuminator are directed in the general direction in which said user is facing.

9. The system claim 7 further comprising controls on said headset which are operated by said user to:

(a) activate and deactivate operation of said image enhancement system;

(b) provide said enhanced image on said first viewing screen or said second viewing screen or both said first and said second viewing screens;

(c) provide icons on at least one said viewing screen representing controllable parameters of said enhanced image; and (d) select and adjust said controllable parameters using said icons and a two position control switch.

10. The system of claim 7 further comprising an earphone to provide audio signals to said user from the environs of the user and from a remote location.

11. The system of claim 10 further comprising a transceiver with which said enhanced image can be transmitted to at least one remote location, and said audio signals can be transmitted to at least one remote location, and an external audio signal can be transmitted from at least one remote location and be heard by said user through said earphone, and an external image can be transmitted from at least one remote location and viewed by said user on at least one said viewing screen.

12. The system of claim 7 further comprising a power supply affixed to said headset to provide electrical power to said system.

13. The system of claim 7 wherein said first and second viewing screens are liquid crystal displays comprising lithium niobate crystals which have two optical paths for doubling resolution of said enhanced image to about 800 horizontal TV lines and a capacity of over 1 million pixels.

14. The system of claim 7 further comprising an activator in cooperation with a speech recognition means whereby said image enhancement system is activated by a voice command.

15. The system of claim 7 further comprising an activator cooperating with a motion detector means whereby said image enhancement system is activated by motion.

16. A method for enhancing an image of an object under adverse conditions, the method comprising the steps of:

(a) providing a viewing device for viewing by a user;

(b) providing a camera system which cooperates with said viewing device;

(c) aiming said camera system to capture said image of said object; and (d) matching a lens element and a CCD camera circuit element of said camera system in that the lens element determines how much reflected raw wavelength information enters the CCD camera circuit element so that an enhanced image of said object is viewed at said viewing device by said user at true scale and range.

17. The method of claim 16 further including the step of illuminating said object with high intensity infrared light.

18. The method of claim 17 further comprising the step of automatically adjusting said camera system for conditions of varying a light intensity using an iris equipped with light sensing component.

19. The method of claim 18 wherein said viewing device comprises at least one liquid crystal display comprising lithium niobate crystals.

20. The method of claim 16 including an additional step of initiating said matching step by voice command.

21. The method of claim 16 including an additional step of transmitting said enhanced image to a remote location.

* * * * *